(12) United States Patent
Jeganathan et al.

(10) Patent No.: US 10,266,704 B2
(45) Date of Patent: Apr. 23, 2019

(54) METHOD FOR MARKING A TRANSPORTATION CORRIDOR

(71) Applicant: Potters Industries, LLC, Wilmington, DE (US)

(72) Inventors: Suruliappa Jeganathan, Chadds Ford, PA (US); Chris Davies, Plymouth Meeting, PA (US); Kevin Goforth, Chester Springs, PA (US)

(73) Assignee: Potters Industries, LLC, Wilmington, DE (US)

( * ) Notice: Subject to any disclaimer, the term of this patent is extended or adjusted under 35 U.S.C. 154(b) by 0 days.

(21) Appl. No.: 16/158,872

(22) Filed: Oct. 12, 2018

(65) Prior Publication Data

US 2019/0040267 A1 Feb. 7, 2019

Related U.S. Application Data

(62) Division of application No. 15/061,051, filed on Mar. 4, 2016, which is a division of application No. 14/132,521, filed on Dec. 18, 2013, now Pat. No. 9,309,637.

(60) Provisional application No. 61/739,378, filed on Dec. 19, 2012.

(51) Int. Cl.

| | | |
|---|---|---|
| *E01C 19/12* | (2006.01) | |
| *C09D 5/33* | (2006.01) | |
| *E01C 19/18* | (2006.01) | |
| *E01F 9/50* | (2016.01) | |
| *C09D 7/62* | (2018.01) | |
| *E01C 23/16* | (2006.01) | |
| *E01F 9/524* | (2016.01) | |
| *B05C 11/11* | (2006.01) | |
| *E01F 9/506* | (2016.01) | |
| *B05D 7/00* | (2006.01) | |
| *C09D 163/00* | (2006.01) | |
| *B05D 5/06* | (2006.01) | |

(52) U.S. Cl.
CPC .............. *C09D 5/004* (2013.01); *B05C 11/11* (2013.01); *B05D 5/063* (2013.01); *B05D 7/54* (2013.01); *B05D 7/58* (2013.01); *C09D 7/62* (2018.01); *C09D 163/00* (2013.01); *E01C 19/12* (2013.01); *E01C 19/18* (2013.01); *E01C 23/166* (2013.01); *E01F 9/50* (2016.02); *E01F 9/506* (2016.02); *E01F 9/524* (2016.02)

(58) Field of Classification Search
CPC .......... E01C 19/12; E01C 19/15; E01C 19/16; E01C 19/18; E01C 19/20; E01C 19/2005
USPC ......................................... 404/108, 110, 111
See application file for complete search history.

(56) References Cited

U.S. PATENT DOCUMENTS

| | | |
|---|---|---|
| 894,859 A | 8/1908 | Southgate |
| 2,821,890 A | 2/1958 | Wilson |
| 3,443,494 A | 5/1969 | Boettler et al. |
| 3,642,649 A | 2/1972 | Green |
| 3,682,054 A | 8/1972 | MacPhail et al. |
| 3,807,634 A | 4/1974 | Vogt |
| 4,162,358 A | 7/1979 | Marquis et al. |
| 4,273,914 A | 6/1981 | Smith et al. |
| 4,629,742 A | 12/1986 | Brady et al. |
| 4,668,736 A | 5/1987 | Robins et al. |
| 4,856,931 A | 8/1989 | Bollag |
| 5,508,373 A | 4/1996 | Shah et al. |
| 5,544,972 A | 8/1996 | Boldt |
| 5,746,935 A | 5/1998 | Corley et al. |
| 5,897,914 A | 4/1999 | DePriest |
| 5,958,593 A | 9/1999 | Shomer |
| 6,911,109 B2 | 6/2005 | Giroux et al. |
| 6,918,714 B2 | 7/2005 | Chambard |
| 6,987,161 B2 | 1/2006 | Schile |
| 7,358,312 B2 | 4/2008 | De Cock et al. |
| 7,963,719 B2 | 6/2011 | Wilson, Sr. |
| 8,465,224 B2 | 6/2013 | Price et al. |
| 8,647,013 B2 | 2/2014 | Davies et al. |
| 8,740,498 B2 | 6/2014 | Velicky |
| 9,309,637 B2 | 4/2016 | Jeganathan et al. |
| 2011/0195179 A1 | 8/2011 | Davies et al. |
| 2016/0185977 A1* | 6/2016 | Jeganathan .............. B05D 7/58 427/137 |

* cited by examiner

*Primary Examiner* — Gary S Hartmann

(74) *Attorney, Agent, or Firm* — Buchanan Ingersoll & Rooney PC

(57) ABSTRACT

A method or applying a fast curing epoxy traffic marking composition is provided in which curing agents are coated on a carrier such as glass beads or porous silica. These carriers are dropped onto the epoxy coating and promote rapid curing of the top layer of the epoxy coating while the bottom layer is given additional time to adhere to the roadway surface.

15 Claims, No Drawings

METHOD FOR MARKING A TRANSPORTATION CORRIDOR

CROSS REFERENCE TO RELATED APPLICATIONS

This application is a divisional application claiming priority to U.S. patent application Ser. No. 15/061,051, filed on Mar. 4, 2016, now allowed, which claims priority to U.S. patent application Ser. No. 14/132,521, filed Dec. 18, 2013, now U.S. Pat. No. 9,309,637, and claiming priority to U.S. Application No. 61/739,378 filed on Dec. 19, 2012. All indicated references are incorporated by reference herein.

BACKGROUND OF THE INVENTION

Field of the Invention

This invention relates to the field of epoxy traffic marking compositions and more particularly to a composition and method for improving the cure time of such traffic markings.

Description of the Related Art

Epoxy binders currently used in traffic markings consist of two parts. One part (often called resin part or part A) is a formulation containing epoxy monomers or oligomers along with white or yellow pigments. The second part (called part B or hardener) is a formulation of one or more chemicals such as amines, phenols, alcohols or their derivatives. When two parts of resin (part A) and one part of hardener (part B) are mixed, a reaction takes place between the epoxy resin and the hardening agent resulting in a polymerization of epoxy. Once the polymerization completes or nearly completes, the whole mixture become very hard (cured epoxy resin). The mixing ratio of the two parts can vary depending on the formulation.

These epoxy binders are used in many types of coatings on substrates like floor, concrete, metal, plastic and other surfaces. They are also used as highway traffic markings. Some examples of commercial epoxy binders in traffic markings are LS-50, LS-60, and LS-65 from Epoplex company; Poly-Carb Mark 55, Poly-Carb 55.2, Poly-Carb 55.3, Poly-Carb Mark 55.4, Poly Carb Mark 55.6 from Dow Chemicals; Ennis HPS-2, Ennis HPS-3, and Ennis HPS-4 from Flint-Ennis; and the corresponding hardeners are sold under the same name. Epoxy traffic markings offer good durability and excellent protection from ultraviolet ray degradation. Epoxy binders, especially slow set epoxy binders, flow well on asphalt and concrete surfaces, fill all gaps in asphalt and concrete surfaces and give a good surface over which retroreflective glass beads can be applied.

In some applications, it is desirable to speed up the hardening of the epoxy composition through the use of curing agents. In general, many classes of chemicals have been used as curing agents for epoxy during the past 50 years. Some examples of classes of chemicals are amines, alcohols, phenols, acids, metal salts, and a combination of one or more of these classes.

U.S. Pat. No. 3,642,649 describes the use of salts prepared from tertiary amine and acids like hydrobromic acid or toluene sulfonic acid as curing agents. These amine salts cure epoxy resin at low temperatures (40 to 70° F.) which takes several hours to cure.

U.S. Pat. No. 4,162,358 describes the use of aromatic amines as curing agents for epoxy at 80° C. and above.

U.S. Pat. No. 4,273,914 describes the use of carboxylic acid anhydride and Lewis acid complex as a fast curing agent for epoxy compositions. These are mainly for electrical applications where the Lewis acid catalysts are from $SbCl_5$, $BF_3$, $TiCl_4$, $SnCl_4$, and their mixtures. The cure time at room temperature is more than 36 hours.

U.S. Pat. No. 4,629,742 describes the use of mannich bases (beta-amino-ketones) as curing agents.

U.S. Pat. No. 4,668,736 describes the use of metal salts as curing agents, particularly nitrates and perchlorates. Calcium nitrate is studied in detail.

U.S. Pat. No. 5,508,373 describes the use of various aliphatic and cycloaliphatic amines as curing agents (hardeners) for epoxy.

U.S. Pat. No. 5,746,935 describes the use of various alcohols and their derivatives as curing agents for epoxy.

U.S. Pat. No. 5,958,593 describes the use of a mixture of aliphatic amine and metal salt, like calcium nitrate, as a curing agent.

U.S. Pat. No. 6,987,161 describes various mixtures of chemicals as curing agents for epoxy. The mixtures of chemicals are from classes of amines, hetero aromatic amines, diamide, primary amines, tertiary amines, acids, phenols, and alcohols. This patent also teaches how the mixture can change the curing temperature and rates.

U.S. Pat. No. 6,911,109 describes how a polymer of acrylic monomer when mixed with epoxy improves the properties of the final composite. The curing agents (hardeners) disclosed are similar to those discussed herein.

U.S. Pat. No. 7,358,312 describes the use of heterocyclic-based amines and their mixtures with other amines.

SUMMARY OF THE INVENTION

One of the problems with epoxy binders is that it takes several hours to achieve complete curing. When an epoxy binder is used as a roadway line marking, application contractors must close the road to traffic for more than 7-8 hours to protect the markings from damage from vehicles. The application cost becomes high as the wait time increases for the contractors. The wait time also inconveniences the motorists using the roadway.

There is a need for products that will cure the epoxy binders used in coatings applications, especially highway traffic markings, at a faster rate than the current binders. For ease of application, such products should be able to be conveniently applied by contractors.

If the curing agents are instead mixed with the part B hardener, the epoxy layer will cure quickly, but the whole layer will cure fast and no difference between top and bottom layer will develop. In this situation, the coating layer cures very fast and the binder does not have enough time to adhere well onto the roadway surface. In such circumstances, the cured layer will eventually peel off from the asphalt over time. Therefore, the curing agent must be applied after the epoxy layer has been deposited on the roadway surface.

One difficulty with the application of a curing agent is that it must be carefully metered. Given the relatively small amount of curing agent required, it is very difficult to control the application of a drop-like or atomized dispersion of the curing agent.

It has been found that a carrier coated with the curing agent can provide a controlled mechanism for applying the curing agent to the epoxy coating. By using a carrier, the curing agent can be applied to the epoxy layer in a similar manner to the application of retroreflective glass beads used in traffic markings. Such drops would initially start the curing of the epoxy binder at the top of the epoxy layer giving enough time for the lower part of the epoxy layer to adhere well to the roadway surface.

The curing agents used to cure the epoxy resin are known in literature and discussed in some of the patents referenced above. When these curing agents are dropped on the epoxy layer, curing starts at the top part of the layer because of the immediate contact while the bottom part of the epoxy layer is still fluid and slow curing. This permits the bottom part of the epoxy layer to adhere well to asphalt or concrete surfaces. Once the top part of the epoxy layer starts curing, the polymerization reaction slowly descends through the epoxy layer, providing adequate time for the adhesion of the epoxy layer to the roadway surface.

DETAILED DESCRIPTION OF THE PREFERRED EMBODIMENTS

The present invention proposes to accelerate the curing of the epoxy layer by depositing a carrier containing a curing agent to the epoxy layer. The use of a carrier permits the curing agent to be applied in a drop-like manner so that it starts the curing of the binder layer, usually 15-30 mil wet thickness, from the top while the bottom part of the layer has enough time to adhere to asphalt or concrete surface.

This invention offers a convenient solution to this application problem by providing a differential curing rate of the epoxy layer. The top part of the epoxy layer starts curing faster than bottom layer, and the total curing is achieved in a shorter time without affecting the adhesion efficiency of the bottom part of the epoxy layer.

The curing agent can be selected from the class of chemicals including amines, alcohols, acids, and metal salts. These coating agents are coated on glass beads or porous silica. The coated beads or porous silica can be dropped onto the epoxy layer by the application contractor followed by the application of the retroreflective glass beads. Alternatively, the coated beads or porous silica can be blended with the retroreflective glass beads and applied simultaneously on the epoxy road markings.

The amines used in the coating include aliphatic amines like ethylenediamine, diethylenetriamine, triethylenetetramine, tetraethylenepentamine, 1,6-hexamethylenediamine; cyclic amines like cyclohexyl amines and their derivatives; aromatic amines like benzyl amines and their derivatives; and heterocyclic amines like piperazine, imidazole and their derivatives.

The alcohols used in the coating can include aliphatic alcohols or phenols and their derivatives.

The acids used in the coating can include aromatic carboxylic acids, aromatic sulphonic acid and their derivatives.

The metal salts used in the coating can include sodium, potassium, or calcium nitrates.

Most preferred is a mixture of triethanolamine, piperazine, N-aminoethylpiperine, and diethanolamine in different ratios. One commercial product which consists of these chemicals, Accelerator 399 from Huntsman Chemicals, has been found to perform well. A solution of Accelerator 399 in water or isopropyl alcohol was coated on glass beads or porous silica. The concentration of the solution can be in the range of 5-25%, preferably in the range of 10-15%.

The preferred metal salt is calcium nitrate. A solution of calcium nitrate tetrahydrate in water or isopropyl alcohol is preferred. One commercial product Accelerator 3130 from Huntsman Chemical which is a solution of calcium nitrate in ethyl alcohol has been used. The concentration of the solution can be in the range of 5-25%, preferably 10-15%.

The glass beads are in the range of between 20-200 US Mesh, preferably in the range of 20-150 US mesh. The porous silica has a surface area of in the range of 1.0 cc/g to 1.9 cc/g, preferably in the range of 1.08 cc/g to 1.78 cc/g. The surface area of porous silica ranges from 300 $m^2$/g to 400 $m^2$/g, preferably between 320 $m^2$/g to 380 $m^2$/g.

The efficiency of the present invention was determined by dropping coated glass beads or porous silica on to a slow set epoxy drawdown (6 inch×8 inch glass) panel at 40-50° C. and measuring the cure time. Using a wood stick, a line was drawn across the epoxy drawdown at regular intervals and the time taken until the wood stick no longer made a line was noted. At this point, the epoxy layer became too hard for the wood stick to make a line on it. The time difference for complete curing between the panel without the coated materials described in this invention and the panel with the coated material defines the efficiency of the curing.

A 50-60% reduction in cure time was observed when chemicals coated on porous silica were used, whereas 20-40% reduction in time was observed with chemicals coated on glass. The cure time also depends on the initial temperature when the epoxy binder components (part A and B) are mixed, with higher temperatures correlating with shorter cure times. In general, contractors apply the epoxy binder for traffic markings between 40 to 55° C. It is also noted that the asphalt may have a higher or lower temperature depending on weather.

This invention describes products that can be conveniently applied to epoxy traffic markings as a drop on which facilitates the curing at the top of the layer first then cure the complete layer at a shorter time compared to epoxy markings without these products.

Example 1

Accelerator 399 (15 grams) was added to water (7.5 grams) and stirred well to get a homogeneous solution. 5 grams of this solution were added drop wise to 100 grams of glass beads (20-150 US mesh) in a rotating tumbler while rotating. The dried beads were stored in a closed bottle.

Example 2

Example 1 was repeated except 1,6-hexamethylenediamine was used instead of Accelerator 399.

Example 3

Accelerator 399 (15 grams) was added to water (7.5 grams) and stirred well to get a homogeneous solution. 15 grams of this solution were added drop wise to 100 grams of porous silica in a rotating tumbler while rotating. The dried material was stored in a closed bottle.

Example 4

Example 3 was repeated except 1,6-hexamethylenediamine was used instead of Accelerator 399.

Example 5

5 grams of Accelerator 3130 were added drop wise to 100 grams of glass beads (20-150 US mesh) in a rotating tumbler while rotating. The dried beads were stored in a closed bottle.

Example 6

15 grams of Accelerator 3130 were added drop wise to 100 grams of porous silica in a rotating tumbler while rotating. The dried material was stored in a closed bottle.

Example 7

Calcium nitrate tetrahydrate (10 grams) was added to water (10 grams) and stirred well to get a homogeneous solution. 20 grams of this solution were added drop wise to 100 grams of porous silica in a rotating tumbler while rotating. The dried material was stored in a closed bottle.

Example 8

10 grams of polystyrene sulfonic solution in water were added drop wise to 100 grams of glass beads (20-150 US mesh) in a rotating tumbler while rotating. The dried beads were stored in a closed bottle.

Experimental

Epoxy resin LS-65 from Epoplex (part A, 30 g) was taken in a plastic cup and warmed to 50° C. in a water bath. The LS-65 hardener (part B, 15 g) was taken in a second cup and warmed to 50° C. A glass panel (6 inch×18 inch) was placed on a wood holder and was heated by a heat gun for few seconds so that the surface of glass warms to about 50-60° C. Part A and part B of the preheated epoxy resin were mixed using a spatula and poured onto the warmed glass panel and using a drawdown blade a 25 mil wet thickness coating layer was made. The time for complete curing was measured using a wood tongue dispenser and drawing line across the epoxy layer, when no more line can be drawn it is cured. This establishes a baseline curing time.

Method A

The baseline method was repeated to make the epoxy coating layer then 7 grams of the coated beads were immediately dropped on the epoxy layer using a drop box and the time needed for complete curing was observed. The difference in time for complete curing between Method A and the baseline determines the efficiency of the product.

Method B

The baseline method was repeated to make the epoxy coating layer then 7 grams of the coated beads and 18 grams of AASHTO Type I M247 glass beads were immediately dropped on the epoxy layer using a drop box and the time needed for complete curing was observed.

The following table shows the curing efficiency of the products of this invention from Examples 1-8. All experiments were carried out as described in Methods A or B.

| Experiment | Curing agent coated silica or beads | Drop on retro reflective glass beads | Cure time in minutes |
| --- | --- | --- | --- |
| Control (baseline) | no | no | 60-70 |
| Method A | Product of example 1 | no | 45-50 |
| Method A | Product of example 2 | no | 45-50 |
| Method A | Product of example 3 | no | 25-30 |
| Method B | Product of example 3 | Type I M247 | 25-30 |
| Method A | Product of example 4 | no | 30-35 |
| Method A | Product of example 5 | no | 40-45 |
| Method A | Product of example 6 | no | 20-25 |
| Method B | Product of example 6 | Type I M247 | 20-25 |
| Method B | Product of example 7 | Type I M247 | 20-25 |
| Method A | Product of example 8 | no | 35-40 |

The data show amine or calcium nitrate coated glass beads or porous silica described in this invention reduce the cure time by about 40-60%. This time will vary if the coating thickness or initial temperature of epoxy resins changes.

Any documents referenced above are incorporated by reference herein. Their inclusion is not an admission that they are material or that they are otherwise prior art for any purpose.

Although the invention is illustrated and described herein with reference to specific embodiments, the invention is not intended to be limited to the details shown. Rather, various modifications may be made in the details within the scope and range of equivalents of the claims and without departing from the invention.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "Including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Use of the term "about" should be construed as providing support for embodiments directed to the exact listed amount. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for marking a transportation corridor comprising the steps of:

a. applying an epoxy coating to a surface of said transportation corridor from a dispensing apparatus; and
b. applying a curing agent to said epoxy coating, said curing agent being coated on a carrier, said coated carrier being dispensed from said dispensing apparatus.

2. The method of claim 1 further comprising the step of:
c. applying retroreflective beads to said epoxy coating, said retroreflective beads being dispensed from said dispensing apparatus.

3. The method of claim 2 wherein said retroreflective beads are applied to said epoxy coating after said coated carrier is applied.

4. The method of claim 2 wherein said retroreflective beads are applied to said epoxy coating simultaneous with said coated carrier.

5. The method of claim 2 wherein said retroreflective beads and said coated carrier are stored together on said dispensing apparatus.

6. The method of claim 1 wherein said carrier is a glass bead.

7. The method of claim 6 further comprising the step of:
c. applying retroreflective beads to said epoxy coating, said retroreflective beads being dispensed from said dispensing apparatus.

8. The method of claim 7 wherein said retroreflective beads are applied to said epoxy coating after said coated carrier is applied.

9. The method of claim 7 wherein said retroreflective beads are applied to said epoxy coating simultaneous with said coated carrier.

10. The method of claim 7 wherein said retroreflective beads and said coated carrier are stored together on said dispensing apparatus.

11. The method of claim 1 wherein said carrier is porous silica.

12. The method of claim 11 further comprising the step of:
c. applying retroreflective beads to said epoxy coating, said retroreflective beads being dispensed from said dispensing apparatus.

13. The method of claim 12 wherein said retroreflective beads are applied to said epoxy coating after said coated carrier is applied.

14. The method of claim 12 wherein said retroreflective beads are applied to said epoxy coating simultaneous with said coated carrier.

15. The method of claim 12 wherein said retroreflective beads and said coated carrier are stored together on said dispensing apparatus.

* * * * *